United States Patent [19]

Fujimoto et al.

[11] Patent Number: 5,771,107
[45] Date of Patent: Jun. 23, 1998

[54] IMAGE PROCESSOR WITH IMAGE EDGE EMPHASIZING CAPABILITY

[75] Inventors: Masaya Fujimoto; Tadashi Miyazaki; Shinji Hayashi, all of Osaka, Japan

[73] Assignee: Mita Industrial Co., Ltd., Osaka, Japan

[21] Appl. No.: 580,930

[22] Filed: Dec. 29, 1995

[30] Foreign Application Priority Data

Jan. 11, 1995 [JP] Japan ................................. 7-002470
Jan. 11, 1995 [JP] Japan ................................. 7-002471

[51] Int. Cl.$^6$ .............................. H04N 1/38; H04N 1/40; H04N 1/387; G03F 3/08
[52] U.S. Cl. ........................ 358/464; 358/462; 358/453; 358/529; 382/266; 382/267; 382/268; 382/269; 382/199
[58] Field of Search ................................. 358/462, 464, 358/453, 529, 521, 530; 382/167, 266, 269, 267, 268, 227, 265, 199

[56] References Cited

U.S. PATENT DOCUMENTS 4,893,188  1/1990  Murakami et al. ...................... 358/456
5,050,231  9/1991  Watanabe et al. ...................... 382/199
5,459,587  10/1995 Fukushima .............................. 358/462
5,477,346  12/1995 Murata ................................... 358/529
5,488,673  1/1996  Katayama et al. ...................... 382/267

FOREIGN PATENT DOCUMENTS 2-244876  9/1990  Japan .............................. H04N 1/46

Primary Examiner—Edward L. Coles, Sr.
Assistant Examiner—Tia M. Harris
Attorney, Agent, or Firm—Beveridge, DeGrandi, Weilacher & Young, LLP

[57] ABSTRACT

An image processor is provided which emphasis-processes an image to be copied with attention to the detection of black edges so that clear color copy outputs are obtained. R, G and B data read out from an original by a scanner are converted into C, M and Y complementary color data by a complementary color reversing circuit. The complementary color data are transmitted to a black edge processing circuit and to a black edge detecting circuit. The black edge detecting circuit detects the inside or the outside of a black edge, and in accordance therewith, the black edge processing circuit, for example, changes the coefficient of a spatial filter. The output of the black edge processing circuit is outputted to a printer through a black generating circuit, a tone correcting circuit and a half tone processing circuit.

22 Claims, 19 Drawing Sheets

FIG. 8

| 0 | 1 | 0 |
|---|---|---|
| 1 | 4 | 1 |
| 0 | 1 | 0 |

| 0 | 0 | −4 | 0 | 0 |
|---|---|---|---|---|
| −1 | −3 | 16 | −3 | −1 |
| 0 | 0 | −4 | 0 | 0 |

FIG. 18

| X1 | E1 | E2 |
|----|----|----|
| O  | X0 | E3 |
| O  | O  | X2 |

FIG. 21A  MERRY CHRISTMAS

IMAGE PROCESSOR WITH IMAGE EDGE EMPHASIZING CAPABILITY

BACKGROUND OF THE INVENTION

1. Field of the Invention

The present invention relates to an image processor suitable for use in systems such as video printers and copying machines, particularly, color copying machines which color-print color images.

2. Description of the Prior Art

In recent years, the image processor has been steadily developing from a black-and-white image processor into a color image processor. In color printing, images are separated into the three primary colors and captured by the processor to undergo various processings, so that color images are printed on paper. For these processings, various spatial filtering and pattern recognition techniques are used. These techniques produce various applications such as the printing of color video signals for the NTSC and HDTV systems, pictures and CAD (computer-aided design) data.

For example, 1994-model Japanese word processors having functions to prepare greeting cards such as Christmas cards which word processors have been on the market include the following: a word processor in which composite video signals are captured from video tape recorders; a word processor in which a camera is attached to input images; and a word processor in which photos are read in by a scanner attached to the printer. Thus, the range of use of color printing has been steadily and rapidly increasing.

As a typical image processor for color printing, an image processor for use in a color copying machine will be described with a prior art dence as an example. FIG. 1 is a block diagram showing the structure of a conventional image processor for use in a color copying machine. In the figure, an original 1 optically read in by a scanner 2 is converted into analog electric signals corresponding to the three primary colors, i.e. red (R), green (G) and blue (B), analog-to-digital (A/D) converted in 8 bits (256 tones) while being sampled by an A/D converter (not shown) incorporated in the scanner 2, and inputted to a complementary color reversing circuit 3 as numeric data $D_R$, $D_G$ and $D_B$ corresponding to the sampling points, and to an edge detecting circuit 12 as an image data $D_v$.

At the complementary color reversing circuit 3, the complementary colors of the numeric data $D_R$, $D_G$ and $D_B$ are obtained for printing, and complementary color data $D_C$, $D_M$ and $D_Y$ corresponding to cyan (C), magenta (M) and yellow (Y) are outputted. The complementary color data $D_C$, $D_M$ and $D_Y$ are transmitted to an edge correcting circuit 11.

At the edge detecting circuit 12, the image data $D_v$ is edgedifferentiated by a plane high pass filter (not shown), and the differentiation output is binarily shaped to produce an edge detection signal $S_E$. The edge detection signal $S_E$ is transmitted to the edge correcting circuit 11. At the edge correcting circuit 11, the complementary color data $D_C$, $D_M$ and $D_Y$ are processed by a spacial high pass filter (not shown) whose coefficient varies according to the edge detection signal $S_E$ to perform an emphasizing processing in accordance with the presence/absence of edges.

The edge-emphasized complementary color data $D_{C0}$, $D_{M0}$ and $D_{Y0}$ are transmitted to a black generating circuit 5. At the black generating circuit 5, black portions are detected through under color removal (UCR) to produce black data $D_K$. In the under color removal, an operation as shown in FIGS. 20A and 20B is performed.

FIG. 20A shows an example of allocation of the three primary colors, where the amount of yellow is the smallest. The density below a dash and dotted line a of the figure is replaced by black to generate a black portion as shown in FIG. 20B. The black generating circuit 5 outputs data $D_{C3}$, $D_{M3}$ and $D_{Y3}$ having numeric values corresponding to the densities of the hatched portions of FIG. 20B.

The under color removal is originally unnecessary from the viewpoint of the three primary color reproduction theory. In actuality, however, if the three primary colors are printed as they are, sufficient densities cannot be obtained in dark portions and it is necessary to strictly adjust the amounts of toners of the three colors. In addition, the expensive color toners are consumed in large quantities. To prevent such problems, the under color removal is performed.

The complementary color data $D_{C3}$, $D_{M3}$ and $D_{Y3}$ and the black data $D_{K3}$ have their tones corrected by a tone correcting circuit 6 and are converted into complementary color data $D_{C4}$, $D_{M4}$ and $D_{Y4}$ and the black data $D_{K4}$, which are transmitted to a half tone processing circuit 7. At the half tone processing circuit 7, the complementary color data $D_{C4}$, $D_{M4}$ and $D_{Y4}$ and the black data $D_{K4}$ are processed so that half tones become distinct. The output complementary color data $D_{C5}$, $D_{M5}$ and $D_{Y5}$ and the output black data $D_{K5}$ are transmitted to a printer 8.

At the printer 8, the color toners are transferred and fixed onto the paper according to the output complementary color data $D_{C5}$, $D_{M5}$ and $D_{Y5}$ and the output black data $D_{K5}$ to output a copy output 13 from the color copying machine (e.g. Japanese Laid-open Patent Application No. H2-244876).

However, in the above-described conventional image processor for use in a color copying machine, blur is caused at edges. Particularly, in systems which perform net pattern marking and image reversal, the image deterioration due to the blur is remarkable.

For example, recently, word processors are capable of handling color image inputs as described above, and in technical and business documents prepared on such word processors, portions to be emphasized are frequently marked with a net pattern. An example is shown in FIGS. 21A to 21C. Such technical and business documents may include the following four areas: an area including only characters (FIG. 21A); an area including only a net pattern (FIG. 21B); an area including both characters and a net pattern (FIG. 21C); and other areas. Therefore, if edge emphasis is performed simply because edges are present, the portion (FIG. 21C) which the person who prepared the document intends to emphasis is blurred, so that the copy output 13 is indistinct and difficult to read.

A cause of the blur which creates such problems and the degree of its influence will briefly be described in the following for future reference: FIGS. 2A to 2D show a cause of the blur. FIG. 2A shows the density of an image read in by the scanner 2. If such an image is differentiated by a high pass filter, waveforms 25a and 25b as shown in FIG. 2B are obtained. These two waveforms are synthesized and printed.

The following is the meaning of the use of such a high pass filter: Since a modulation transfer function (MTF) which is a spatial frequency characteristic of the optical system and the optical detector of the scanner 2 presents a low pass filter characteristic, for example, by using a lens (not shown) having a finite radius, there is a dullness in the waveforms detected by the scanner 2. The best way to correct this dullness is to use a spatial filter having a characteristic opposite to that of the MTF. However, such an opposite characteristic filter cannot be realized in a simple structure and is not industrial. For simplicity, the image is differentiated by a high pass filter and processed as described above.

However, the density range (dynamic range) which the printer 8 is capable of printing normally is finite as shown by a dash and dotted line 26 of FIG. 2B, and portions like the hatched portions of the waveforms 25a and 25b emphasized through the differentiation are battered. This batter merely causes a clip of the waveform in a dynamic range in an electric circuit. In printing, however, toner which has been outputted onto paper once is irreversible and crushed by a roller or the like in the copying machine to scatter around a printing spot 23 (corresponding to each pixel) as shown by a line 24 of FIG. 2D. This is the main cause of the blur.

Blur is also caused by the following reasons: since the above-described spatial high pass filter processing is performed for a finite number of pixels, the differentiation characteristic reaches the ceiling in the spatial frequency range, so that the effect of edge emphasis is not consummate; and it is necessary to interpose a low pass filter for noise cancellation. These problems are typical not only of color copy outputs of color copying machines but also of color print outputs of video printers and computer-aided design (CAD) systems using ink.

In systems which use image reversal, fine lines are further fined by the blur so that it is difficult to emphasize fine line portions such as character areas. Referring to FIGS. 3A to 3D, there is shown a cause of the blur in the image reversal. FIG. 3A shows the density of an image read in by the scanner 2. If this image is differentiated by a high pass filter, waveforms 25a and 25b as shown in FIG. 3B are obtained. If these two waveforms are synthesized, the edge is narrowed as shown in FIG. 3C and the portions above the dash and dotted line 26 of FIG. 3B are battered. Consequently, when the image is printed, toner adheres to the portion other than the printing spot 23 where no images should be printed, causing the blur 24. As a result, the fine lines are further fined.

SUMMARY OF THE INVENTION

An object of the present invention is to provide an image processor which emphasis-processes images to be copied, particularly, with attention to the detection of black edges so that clear color copy outputs are obtained.

To achieve the above-mentioned object, an image processor of the present invention is provided with producing means for producing a variable signal whose value varies according to a contour of an image composed of a predetermined pixel unit, determining means for determining an area of the contour in the image based on the variable signal to output a contour signal, correcting means for correcting the contour signal so as to match the contour of the image to output a correction signal, and varying means for varying the image according to the correction signal. The variable signal produced by the producing means is processed by the determining means into the contour signal by determining an area of the contour of the image, and the correcting means corrects the contour signal so as to match the contour of the image to output the correction signal. By varying the image by use of the correction signal at the varying means, even if the image to be copied is emphasis-processed, particularly, with attention to the detection of black edges, a clear color copy output is obtained.

The determining means may detect a pixel located inside the contour of the image to output the contour signal or may detect a pixel located outside the contour of the image to output the contour signal.

The producing means is provided with converting means for converting the image into a digital image of a numeric value corresponding to a density of the image, comparing means for comparing the digital image with a first reference value and a second reference value to convert the digital image into a ternary signal composed of three values, and removing means for removing an area including a smaller number of pixels than a predetermined number from the image according to the ternary signal.

The determining means provides a predetermined noted pixel according to the variation signal and outputs the contour signal when a pattern of pixels in a vicinity of the noted pixel matches a predetermined first pattern decided to include the values of the ternary signal.

The correcting means outputs the correction signal when a figure formed by spatially arranging a value of the contour signal matches a predetermined second pattern.

Further, according to the present invention, an image processor is provided with extracting means for comparing values of adjoining pixels to detect a boundary between an image formed portion and a background portion and extracting pixels included in an area located along the detected boundary, difference detecting means for detecting a difference between values of adjoining pixels which are among the pixels extracted by the extracting means, and value correcting means for correcting the values of the pixels extracted by the extracting means when the difference detected by the difference detecting means is a predetermined value or more.

According to this feature, the extracting means extracts pixels in an area included in the image formed portion and the value correcting means corrects the values of the pixels so as to approach values of pixels in the background portion. Alternately, the extracting means extracts pixels in an area included in the background portion and the value correcting means corrects the values of the pixels so as to approach values of pixels in the image formed portion.

BRIEF DESCRIPTION OF THE DRAWINGS

This and other objects and features of this invention will become clear from the following description, taken in conjunction with the preferred embodiments with reference to the accompanied drawings in which:

FIG. 8 shows the structure of a smoothing filter in the edge detecting circuit provided in the black edge detecting circuit;

FIG. 9 shows the structure of an edge detecting filter in the edge detecting circuit provided in the black edge detecting circuit;

FIG. 18 shows an operation principle of the black edge processing circuit in the second embodiment;

FIGS. 21A to 21C show an example of an image marked with the net pattern.

DESCRIPTION OF THE PREFERRED EMBODIMENTS

Figure 1:
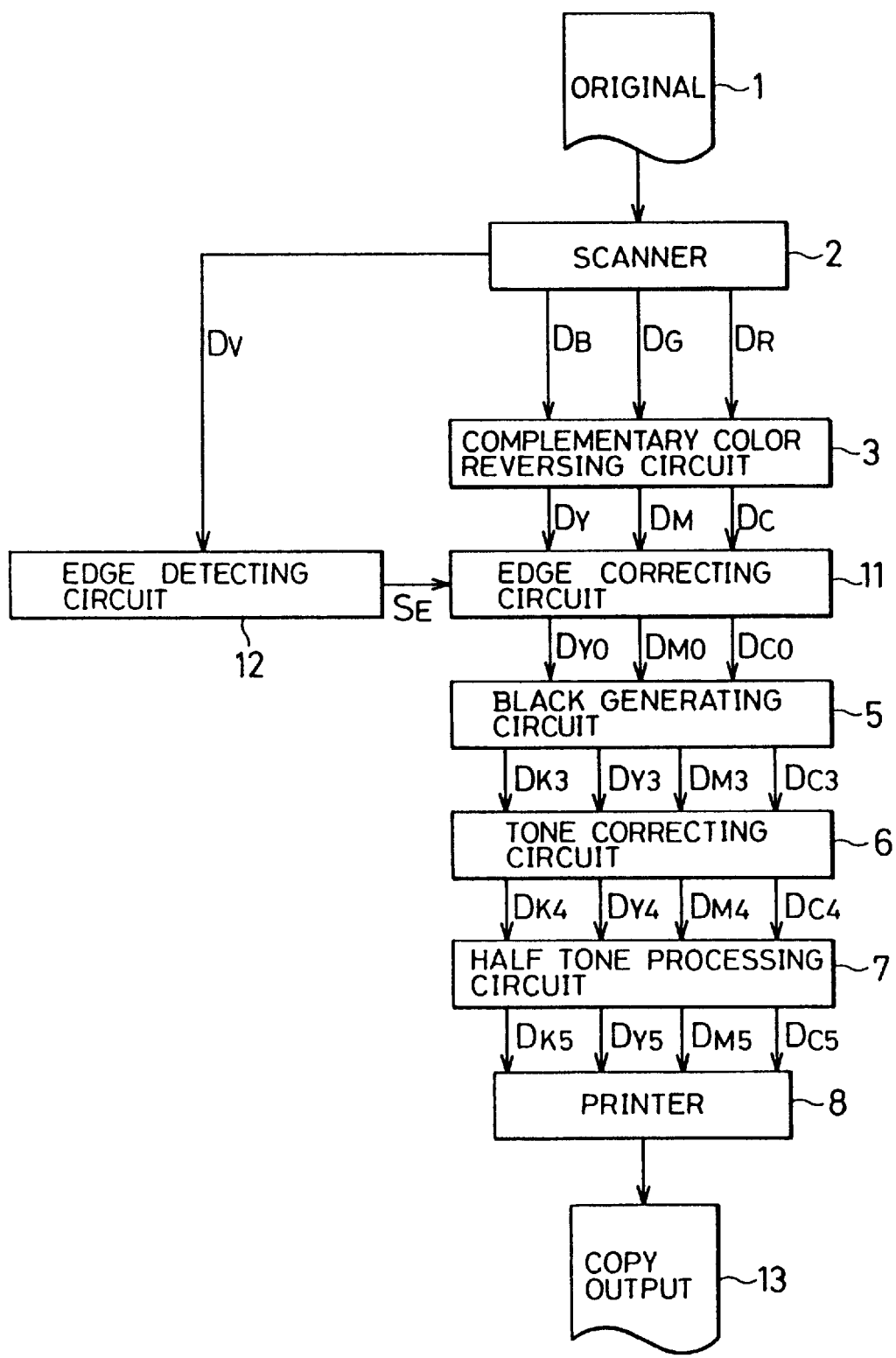
FIG. 1 is a block diagram showing a structure in which a conventional image processor is adapted to a color copying machine.
Figure 2A:
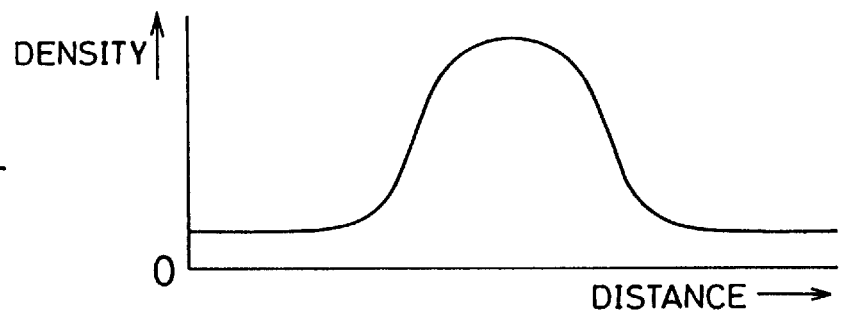
FIGS. 2A to 2D are first views showing blur in a conventional structure.
Figure 2B:
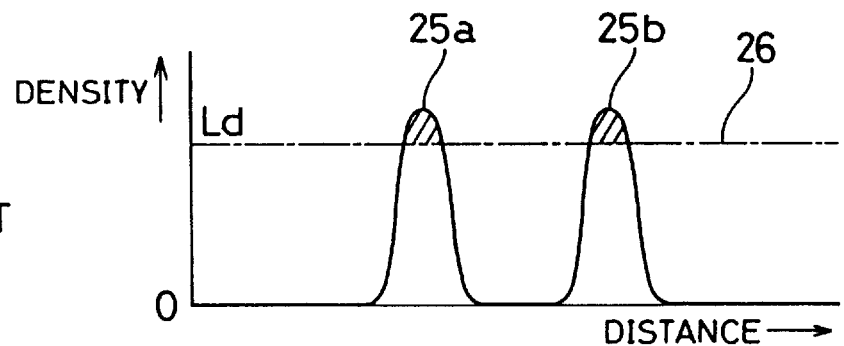
Figure 2C:
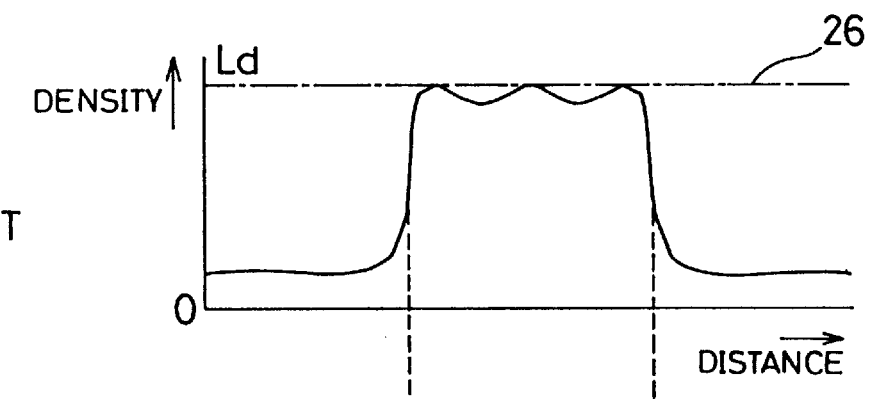
Figure 2D:
Figure 3A:
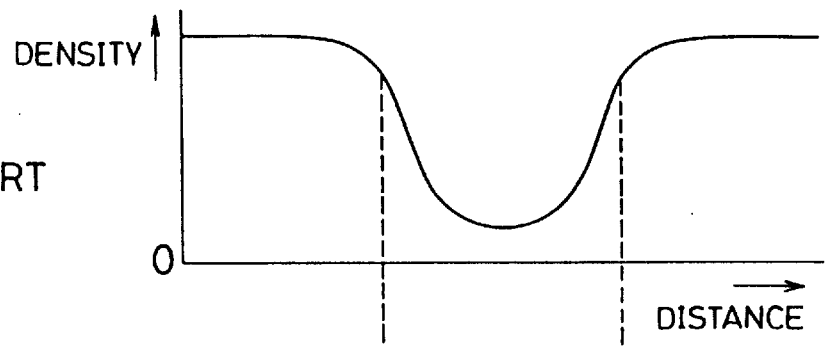
FIGS. 3A to 3D are second views showing the blur in the conventional structure.
Figure 3B:
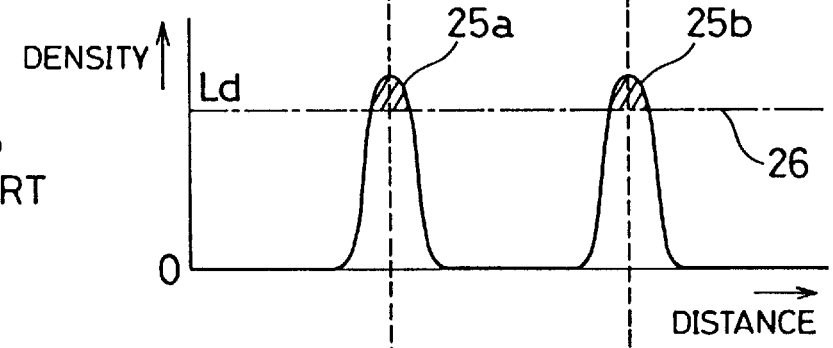
Figure 3C:
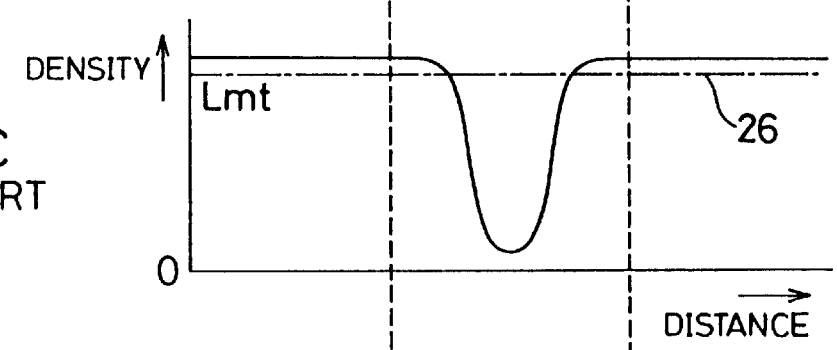
Figure 3D:
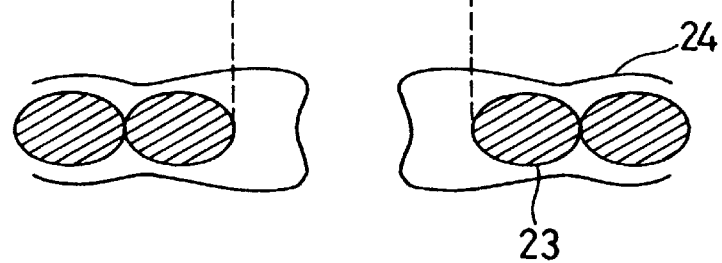
Figure 4:
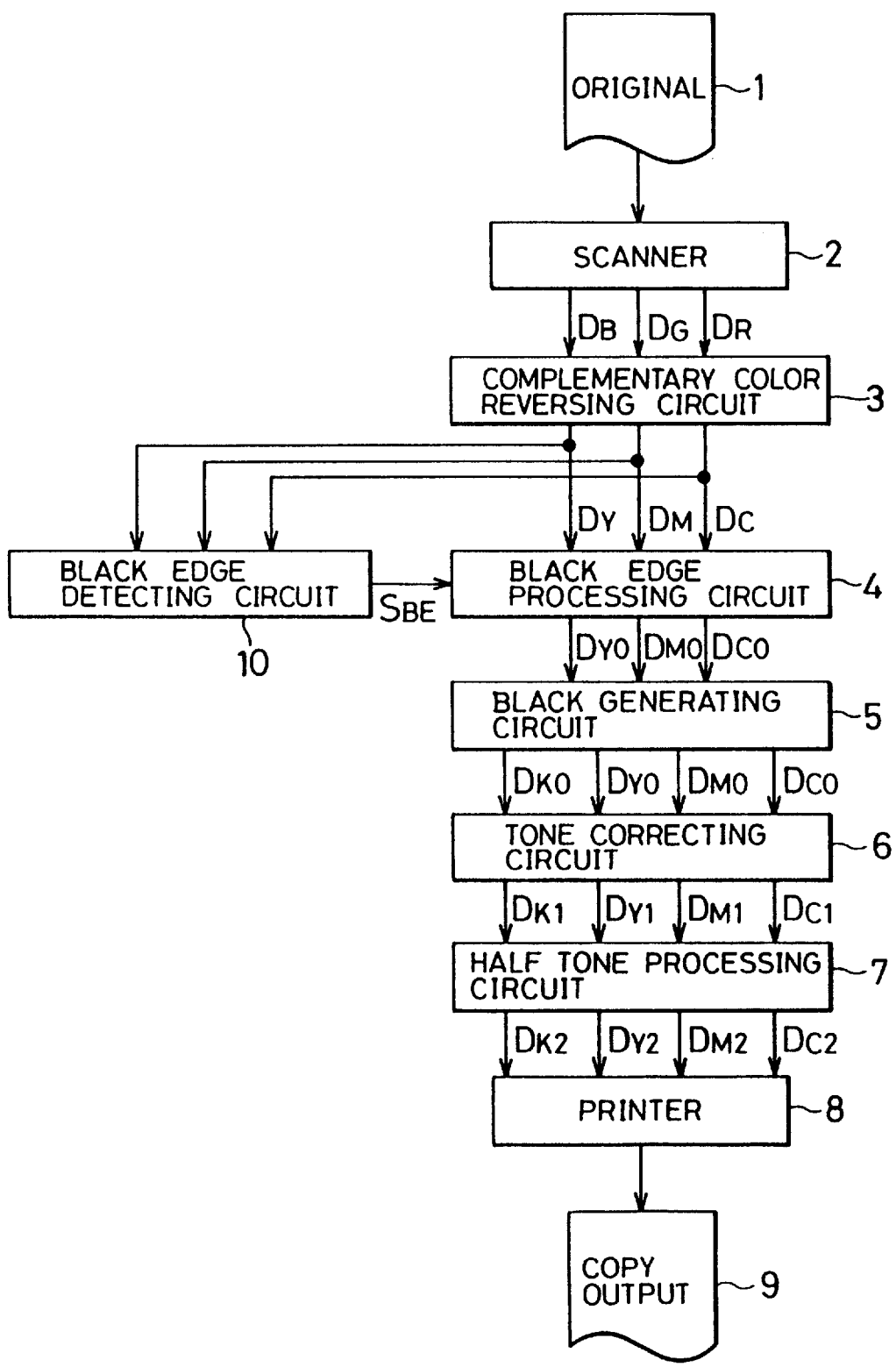
FIG. 4 is a block diagram showing a structure in which an image processor of the present invention is adapted to a color copying machine.

Hereinafter, image processors of the present invention will be described with reference to the drawings. FIG. 4 is a block diagram showing the hardware structure of an image processor according to a first embodiment of the present invention adapted to a color copying machine. In the figure, an original 1, a scanner 2, a complementary color reversing circuit 3, a black generating circuit 5, a tone correcting circuit 6, a half tone processing circuit 7 and a printer 8 are the same as those of the conventional image processor and will not be described. The present invention is characterized in that a black edge processing circuit 4 and a black edge detecting circuit 10 which controls the circuit 4 are provided.

Figure 5:
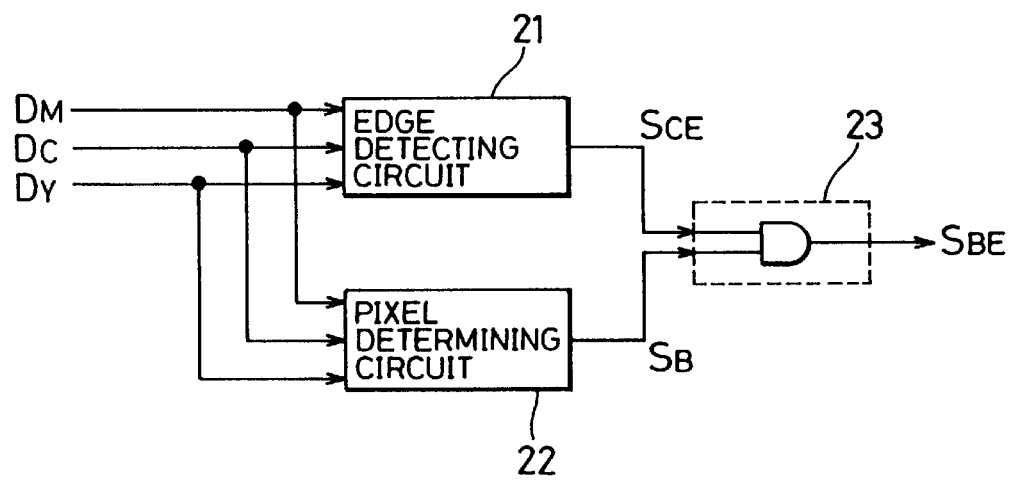
FIG. 5 is a block diagram showing the structure of a black edge detecting circuit.

An operation of the image processor thus structured will hereinafter be described. First, the structure of the black edge detecting circuit 10 will be described with reference to the block diagram of FIG. 5. In the figure, reference numeral 21 represents an edge detecting circuit, reference numeral 22 represents a pixel color determining circuit, and reference numeral 23 represents a result composer comprised of one AND circuit.

At the edge detecting circuit 21, complementary color data $D_M$, $D_C$ and $D_Y$ are received to detect edges of characters and an edge detection signal $S_{CE}$ whose logic becomes "1" in edge areas is outputted. At the pixel color determining circuit 22, the complementary color data $D_M$, $D_C$ and $D_Y$ are also received to determine the color of the pixel and a black determination signal $S_B$ whose logic becomes "1" when the color is black is outputted. The logical product of the edge detection signal $S_{CE}$ and the black determination signal $S_B$ is obtained at the result composer 23 to output a black edge signal $S_{BE}$ whose logic becomes "1" only for pixels in black edge areas.

Figure 6:
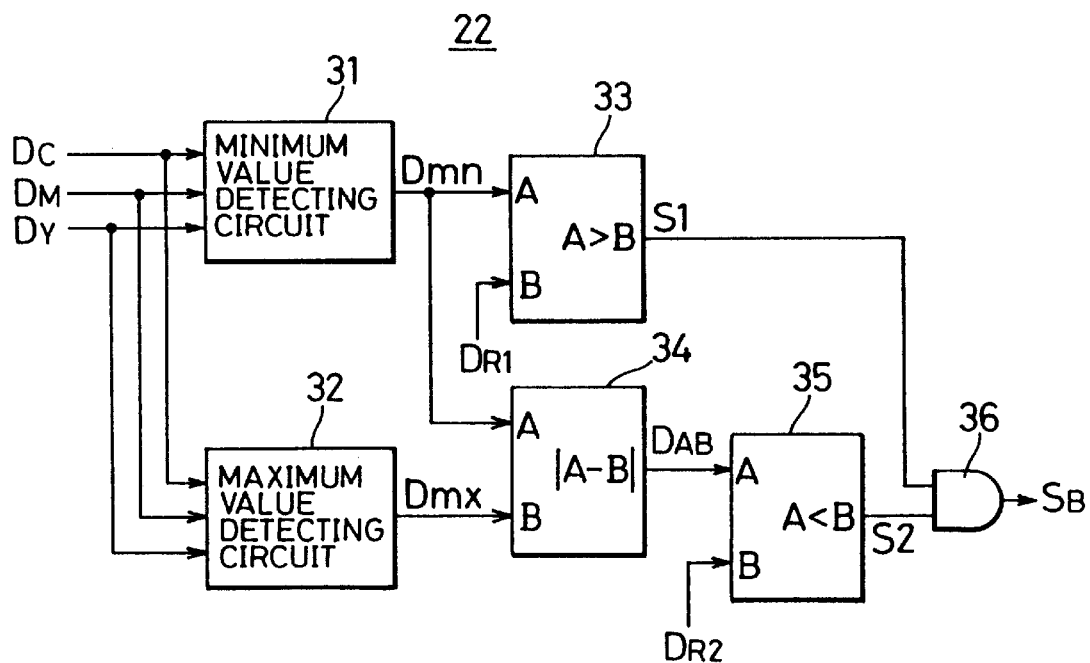
FIG. 6 is a block diagram showing the structure of a pixel color determining circuit provided in the black edge detecting circuit.

The edge detecting circuit 21 and the pixel color determining circuit 22 are structured as follows: First, the structure of the pixel color determining circuit 22 is shown in the block diagram of FIG. 6. In the figure, the complementary color data $D_C$, $D_M$ and $D_Y$ from the complementary color reversing circuit 3 are transmitted to a minimum value detecting circuit 31 and a maximum value detecting circuit 32 to obtain a minimum value Dmn and a maximum value Dmx at their sampling points. The minimum value Dmn outputted by the minimum value detecting circuit 31 is compared with a high reference value $D_{R1}$ (e.g. "200") at a digital comparator 33. When the minimum value Dmn is higher than the reference value $D_{R1}$, a signal SI whose logic is "1" is outputted.

Moreover, with respect to the minimum value Dmn and the maximum value Dmx, the digital arithmetic circuit 34 performs the following calculation:

$$D_{AB} = |Dmn - Dmx| \quad (1)$$

The resulting output $D_{AB}$ is inputted to the digital comparator 35 and compared with a low reference value $D_{R2}$ (e.g. "10"). When it is lower than the reference value $D_{R2}$, a signal S2 whose logic is "1" is outputted.

These processings mean the following: In the digital comparator 33, the reference value $D_{R1}$ is a reference value of printing density, and the logic of the output Si is "1" at a high density and "0" at a low density. On the other hand, in the digital comparator 35, the reference value $D_{R2}$ is a reference value of a determination as to whether the color is chromatic or achromatic, and the logic of the output S2 is "1" in the case of an achromatic color and "0" in the case of a chromatic color.

Here, with respect to black, it is generally known that a relationship $$D_C \approx D_M \approx D_Y \quad (2)$$

holds. Therefore, the color is determined to be achromatic if the maximum values and the minimum values of the complementary color data $D_C$, $D_M$ and $D_Y$ representative of numeric values corresponding to the densities of cyan, magenta and yellow which are complementary colors are substantially the same. Thereby, the logic of an output $S_B$ of the AND circuit 36 is "1" in the case of high density and achromatic color, i.e. in the case of black.

Figure 7:
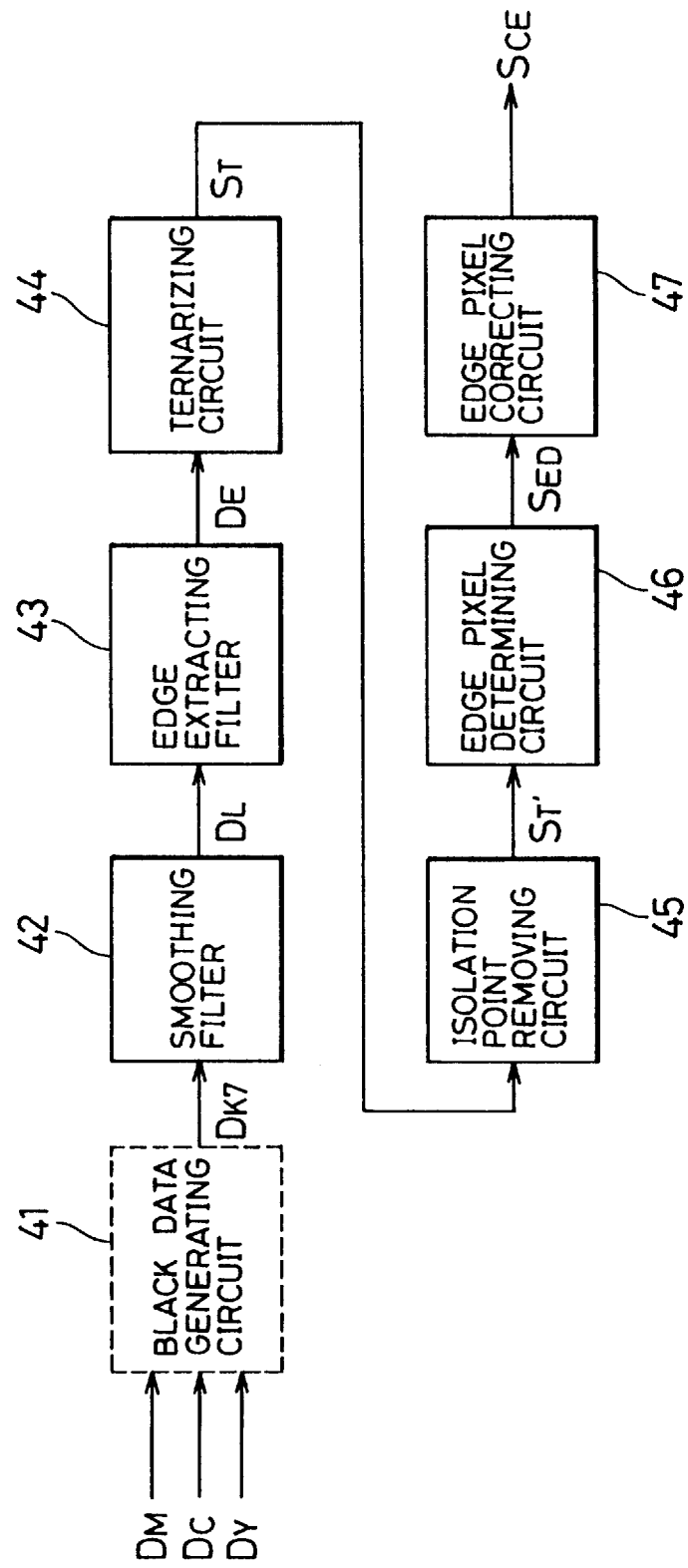
FIG. 7 is a block diagram showing the structure of an edge detecting circuit provided in the black edge detecting circuit.

Subsequently, the structure and operation of the edge detecting circuit 21 will be described. FIG. 7 is a block diagram showing the structure of the edge detecting circuit 21. In the figure, a black data generating circuit 41 produces black data $D_{K7}$ from the complementary color data $D_C$, $D_M$ and $D_Y$ from the complementary color reversing circuit 3 of FIG. 4 according to the principle of the under color removal as previously described in the description of the prior art. This circuit can be deleted, for example, when the data can be obtained from a circuit behind the black generating circuit 5 in FIG. 4.

Figures 8, 9:
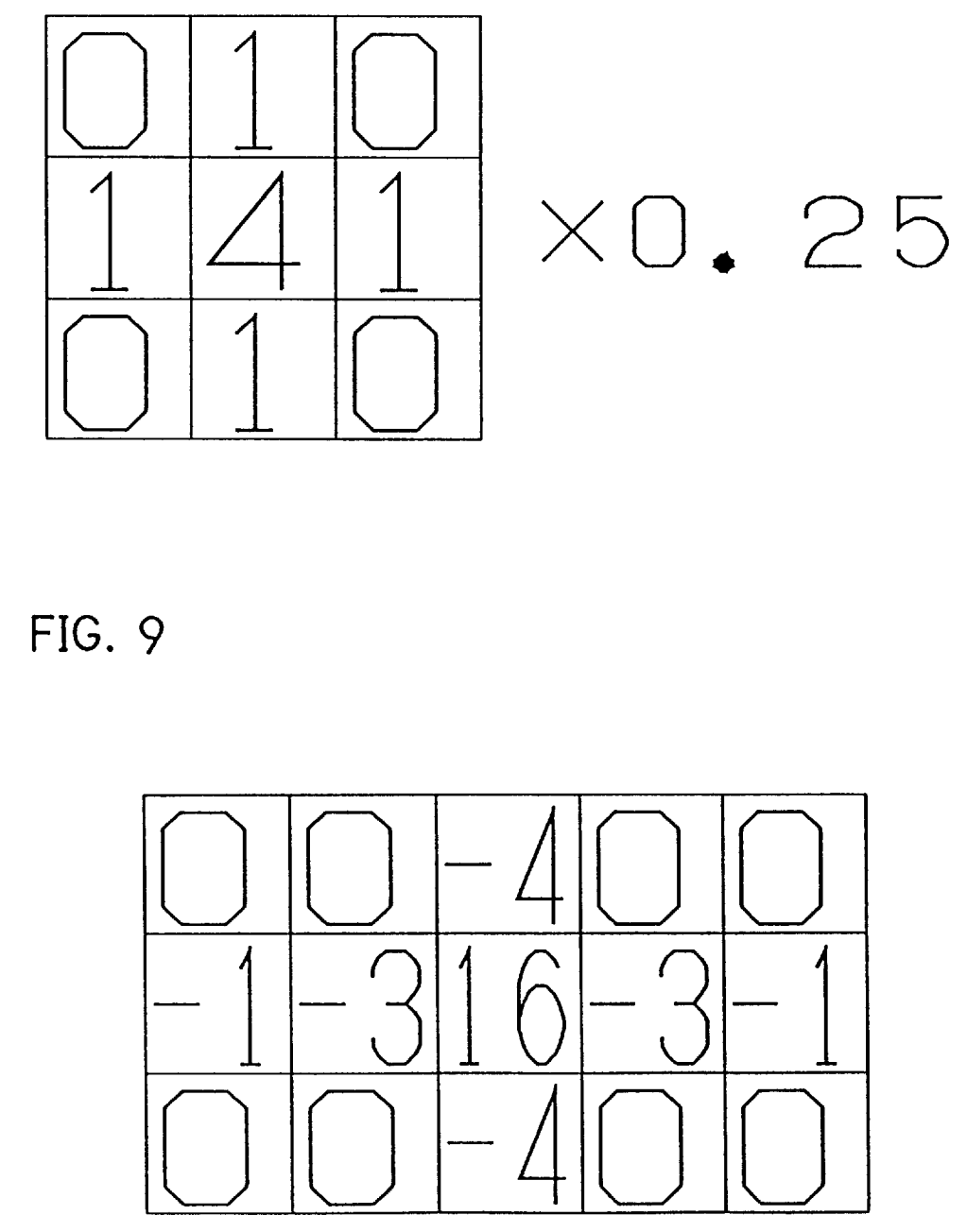
Figure 15A:
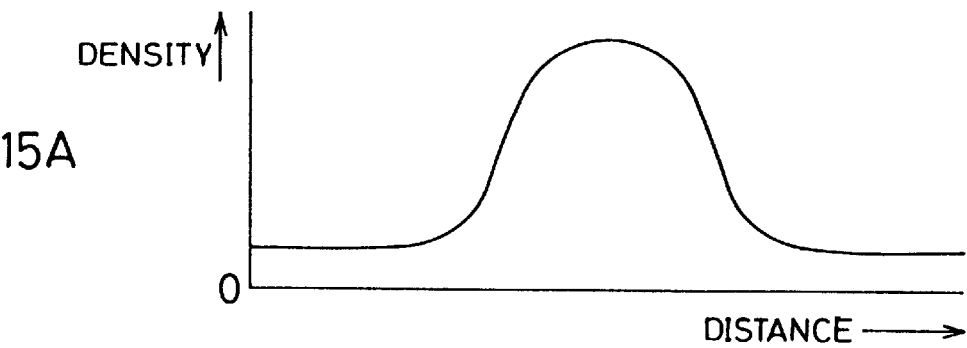
FIGS. 15A to 15D show a density variation at each processing stage and a printing result when a black edge area is processed in the first embodiment.

At a smoothing filter 42, the black data $D_{K7}$ is smoothed by a 3×3 spatial low pass filter having a structure as shown in FIG. 8 and outputted as a smoothed data $D_L$. This processing is performed merely to cancel noises. At an edge extracting filter 43, the smoothed data DL is edged-extracted by a 3×5 spatial high pass filter having a structure as shown in FIG. 9 and outputted as an edge data $D_E$. If the outputs of the spatial filters 42 and 43 are sectioned and expressed one-dimensionally, waveforms as shown in FIGS. 15A and 15B are obtained.

Figure 15B:
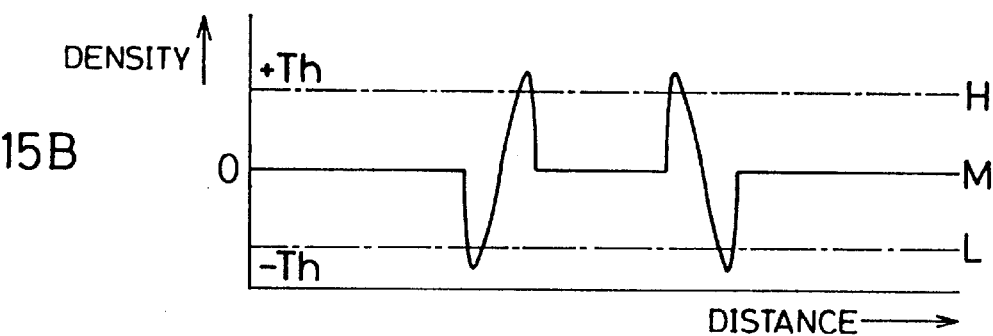

At a ternarizing circuit 44, the edge data $D_E$ as shown in FIG. 15B is waveform-shaped, for example, at two threshold values $t_1$ and $t_2$ having values +Th and −Th, respectively, and is outputted as a ternary signal $S_T$. The two threshold values may take any values as long as $t_1 > t_2$. As a result, the output $S_T$ of the ternarizing circuit 44 is as follows:

$S_T$=H when $D_E \geq t_1$;

$S_T$=M when $t_2 < D_{E<t1}$;

and $S_T$=L when $D_E \leq t_2$ where H represents a high level, i.e. a portion where the variation in density is drastic, M represents an intermediate level, i.e. a portion where the variation in density is gentle, and L represents a low level, i.e. a base portion adjoining an edge.

From the image data thus ternarized, noises which are too great to remove at the smoothing filter 42 are removed at an isolated point removing circuit 45. This is performed, as a pre-processing for subsequently-performed edge pixel determination, to remove an independent pixel of high or low density such as a black stain on the original 1 which spreads at the intermediate level independent of the surroundings.

Figure 10A:
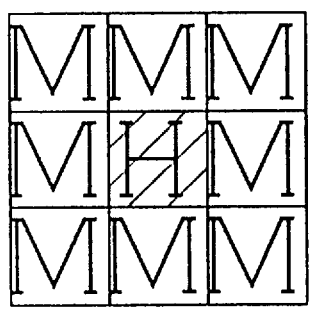
FIGS. 10A and 10B show an operation of an isolated point removing circuit in the edge detecting circuit provided in the black edge detecting circuit.
Figure 10A:
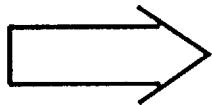
Figure 10A:
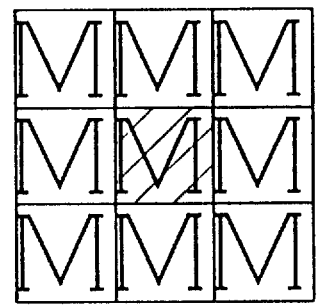
Figure 10B:
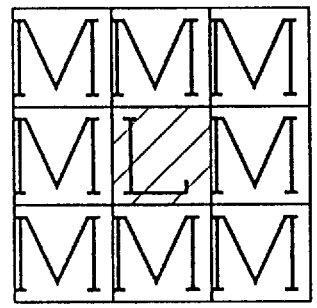
Figure 10B:
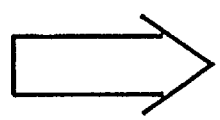
Figure 10B:
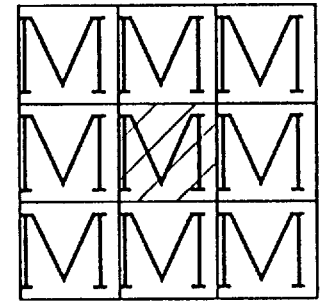

In this processing, when the value of a noted pixel at the hatched portion is "H" as shown in FIG. 10A, if the surrounding eight pixels are all "M", the value is replaced by "M" as shown by the arrow. In the case where the value of a noted pixel at the hatched portion is "L" as shown in Fig. 10B, if the surrounding eight pixels are all "M", the value is replaced by "M" as shown by the arrow.

At an edge pixel determining circuit 46, a pixel located within the edge is determined based on a ternary signal $S_T$ thus isolated-point-removed. As conditions for the determination, there are patterns shown in FIGS. 11A and 11B and FIGS. 12A to 12K. In these figures, noted pixels are hatched. That is, when the value of the noted pixel is "M", if the values of a to h take only "M" and "H" in FIG. 11A and if the surrounding eight pixels are all "H" as shown in Fig. 11B, the logic of an output $S_{ED}$ of the edge pixel determining circuit 46 is "1".

When the value of the noted pixel is "H", if the pattern of the adjoining four pixels matches any of the patterns of FIGS. 12A to 12I, the logic of the output $S_{ED}$ of the edge pixel determining circuit 46 is "1". For this processing, subsequently-described known pattern matching technique is used. In FIGS. 12A to 12K, the values of pixels marked with asterisks and pixels not specified may be any of "H", "M" and "L".

Figure 11A:
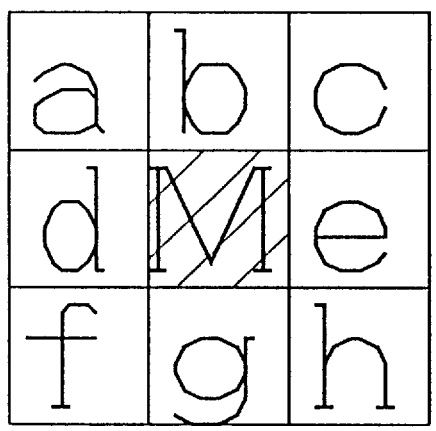
FIGS. 11A and 11B are first views showing an operation of an edge pixel determining circuit in the edge detecting circuit provided in the black edge detecting circuit in a first embodiment.
Figure 11B:
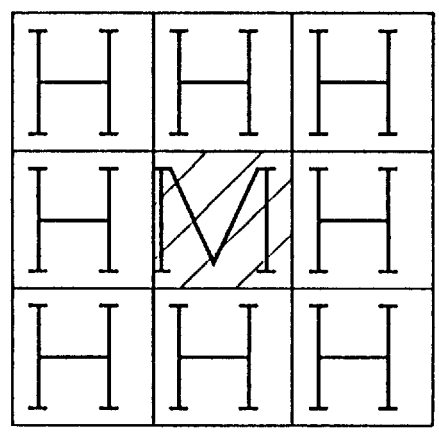
Figure 12A:
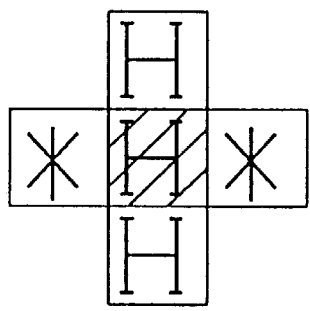
FIGS. 12A to 12K are second views showing the operation of the edge pixel determining circuit in the edge detecting circuit provided in the black edge detecting circuit in the first embodiment.
Figure 12B:
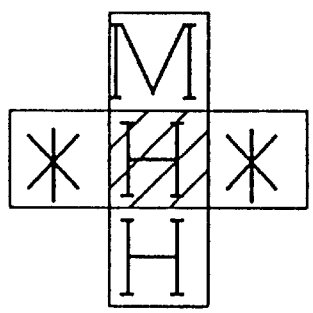
Figure 12C:
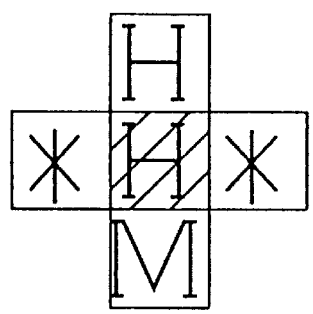
Figure 12D:
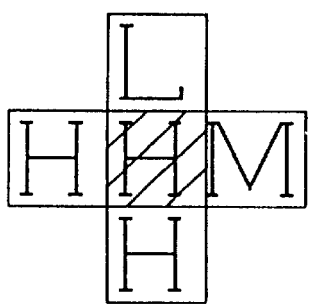
Figure 12E:
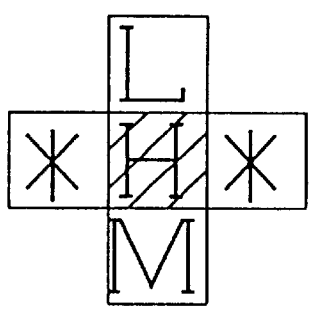
Figure 12F:
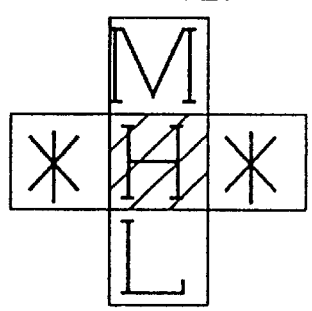
Figure 12G:
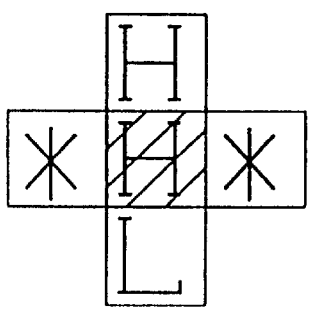
Figure 12H:
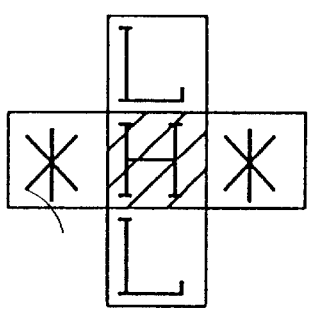
Figure 12I:
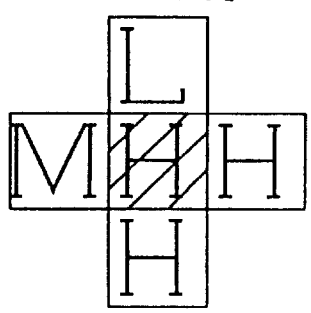
Figure 12J:
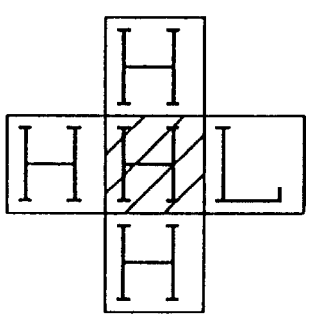
Figure 12K:
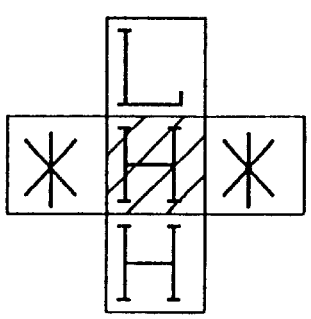
Figure 13A:
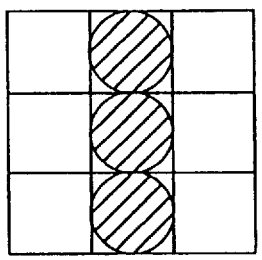
FIGS. 13A to 13L show patterns used in an edge pixel correcting circuit in the edge detecting circuit provided in the black edge detecting circuit.
Figure 13D:
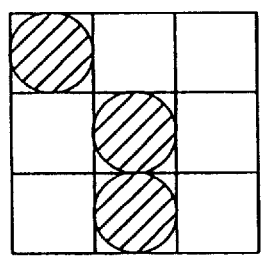
Figure 13G:
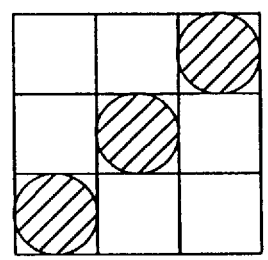
Figure 13J:
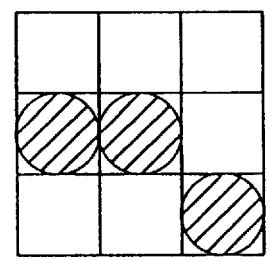
Figure 13B:
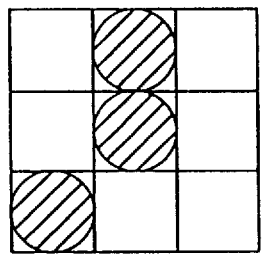
Figure 13E:
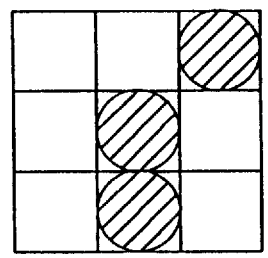
Figure 13H:
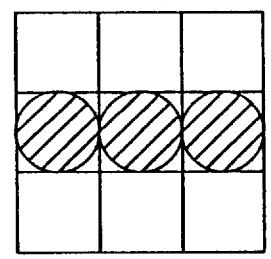
Figure 13K:
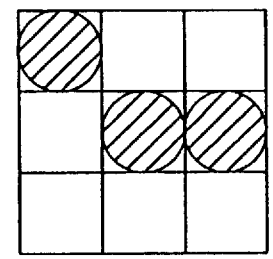
Figure 13C:
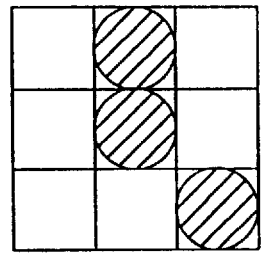
Figure 13F:
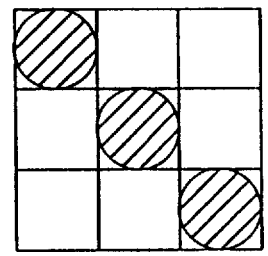
Figure 13I:
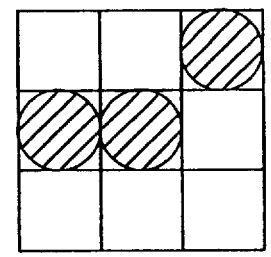
Figure 13L:
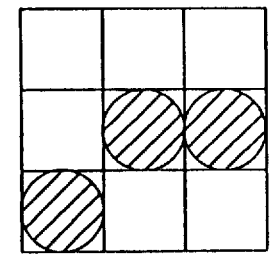

When the value of the noted pixel is "L", or when the pixel pattern matches none of the patterns shown in FIGS. 11A and 11B although the value of the noted pixel is "M" and when the pixel pattern matches any of the pattern of FIGS. 12J or 12K although the value of the noted pixel is "H", the logic of the output $S_{ED}$ of the edge pixel determining circuit 46 is "0". The patterns shown in FIGS. 11A to 11B and 12A to 12K are stored in a read only memory (ROM) provided in the edge pixel determining circuit 46 and the pattern comparison and determination is performed at an arithmetic logic unit (ALU), for example, as a microprocessor unit (MPU) structure.

The output $S_{ED}$ of the edge pixel determining circuit 46 is transmitted to an edge pixel correcting circuit 47 to determine whether the pixel is the final within-edge pixel or not. This is because the patterns representative of pixels of character areas and net-patterned areas are fixed to the twelve patterns as shown in FIGS. 13A to 13L.

Figure 14:
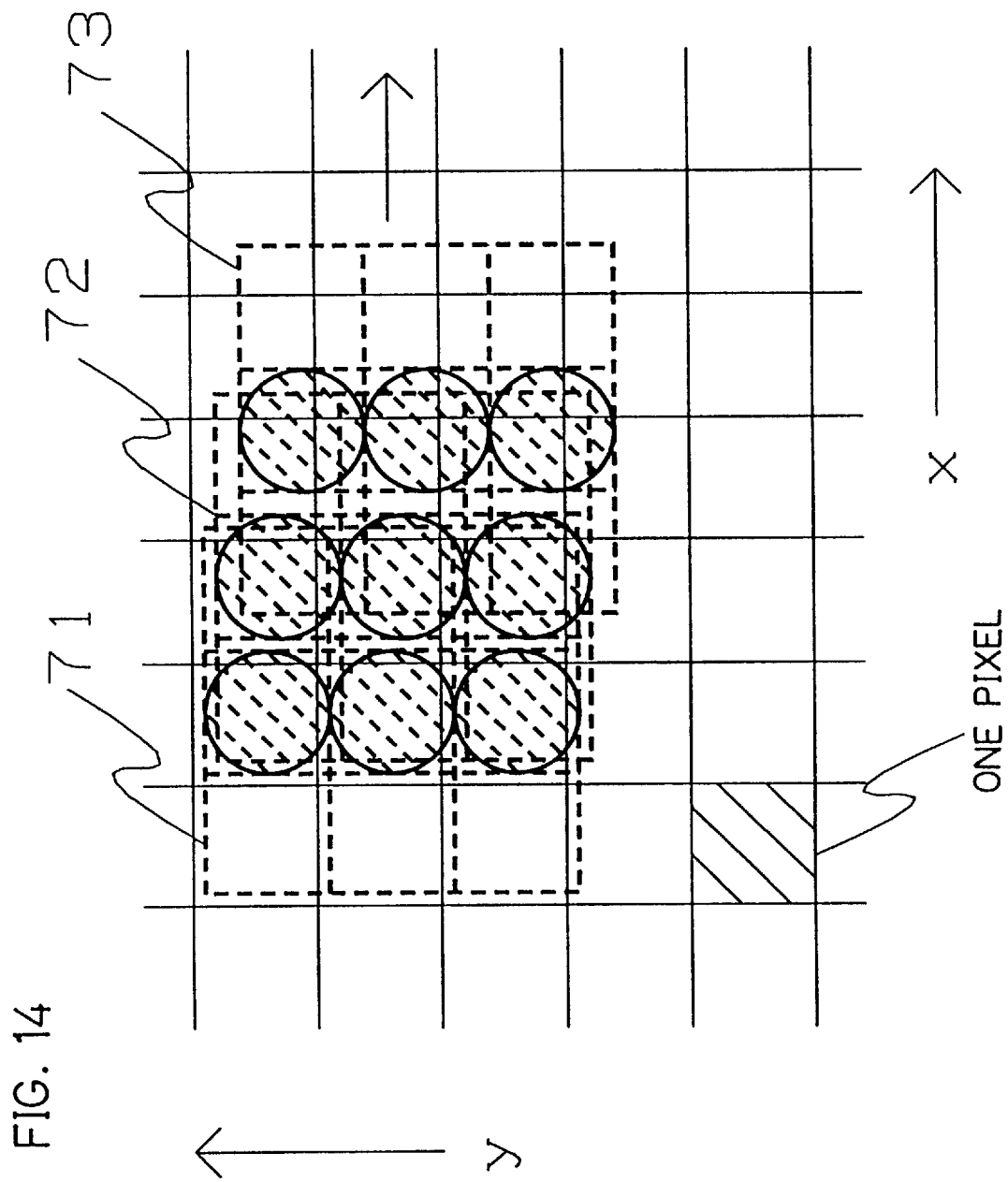
FIG. 14 shows an operation principle of the edge pixel correcting circuit in the edge detecting circuit provided in the black edge detecting circuit in the first embodiment.

As a method to retrieve the pattern, the pattern matching technique may be used like the previously-described edge pixel determining circuit 46. FIG. 14 is a conceptional view showing an operation of such a pattern matching technique. In the figure, each lattice represents one pixel and FIGS. 71 to 73 shown by dotted lines represent positions of the pattern of FIG. 13A at each time. As shown by the arrow, whether the patterns match or not is determined while successively shifting the pattern by one pixel in the direction of x-axis (lateral direction on the plane of the figure). The edge pixel correcting circuit 47 outputs an edge correction signal $S_{CE}$ whose logic becomes "1" only when the patterns match.

This operation is successively performed in the direction of y-axis (longitudinal direction in the figure) for the entire surface of the original 1 read in by the scanner 2 and a similar processing is repeated for all the patterns shown in FIGS. 13A to 13L. In FIG. 14, the patterns 71 to 73 are shown being slightly shifted from one another for easy discrimination.

The edge correction signal $S_{CE}$ is transmitted to the result composer 23 and the succeeding processing is as described previously. As the techniques used for the edge pixel determining circuit 46 and the edge pixel correcting circuit 47, not only the pattern matching but also a so-called pattern recognition technique in which vectors or symbol strings are formed from an image to obtain a correlation between the vectors or the symbol strings may be used. This technique may be used together with the pattern matching technique.

The black edge signal $S_{BE}$ thus produced representative of an inside of an edge of an image is transmitted to the black edge processing circuit 4. The edge is corrected, for example, by reducing the value of a pixel corresponding to the black edge signal $S_{BE}$ by a predetermined amount or by changing the coefficient of the edge differentiating filter. The results are transmitted to the black generating circuit 5 as processed complementary color data $D_{C0}$, $D_{M0}$ and $D_{Y0}$.

The processed complementary color data $D_{C0}$, $D_{M0}$ and $D_{Y0}$ are under-color-removed at the black generating circuit 5 to produce a black data $D_{K0}$ which is transmitted to the tone correcting circuit 6. The succeeding processings at the tone correcting circuit 6 and at the half tone processing circuit 7 are the same as conventional processings and will not be described. The output data of these circuits are designated differently simply because the inputs to the circuits are different because of the processing at the black edge processing circuit 4.

Figure 15C:
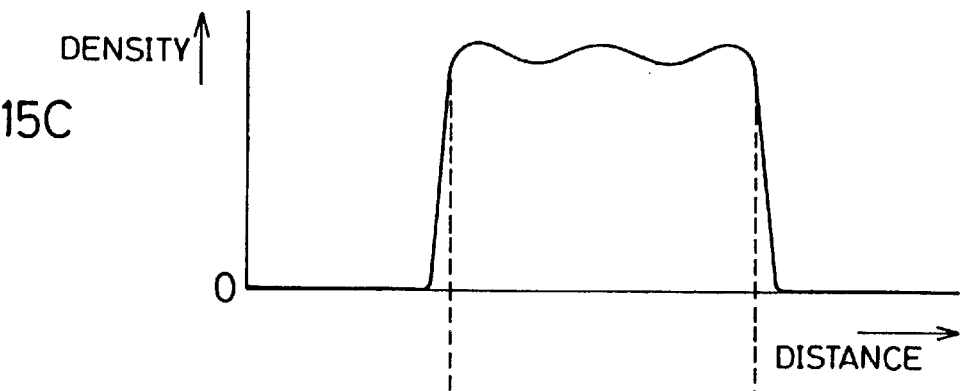
Figure 15D:
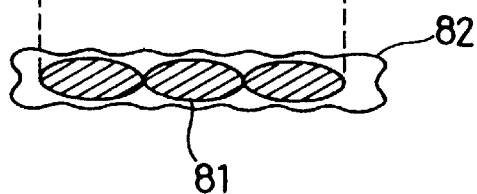
Figure 16A:
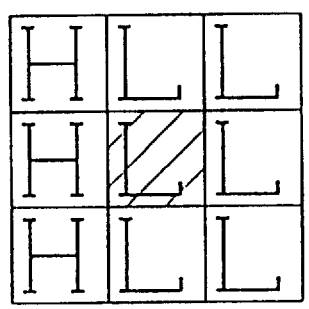
FIGS. 16A to 16E are first views showing an operation of the edge pixel determining circuit in the edge detecting circuit provided in the black edge detecting circuit in a second embodiment.
Figure 16B:
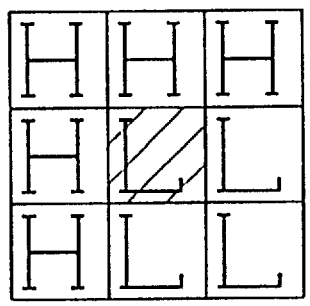
Figure 16C:
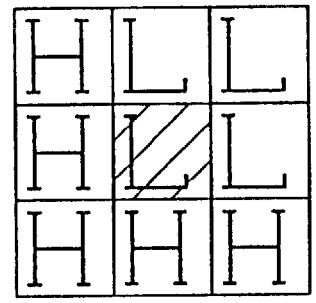
Figure 16D:
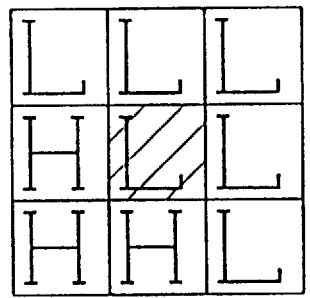
Figure 16E:
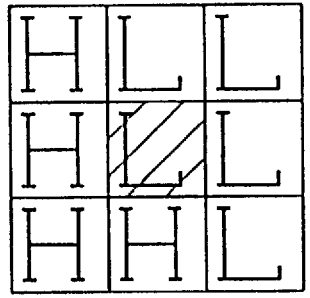
Figure 17A:
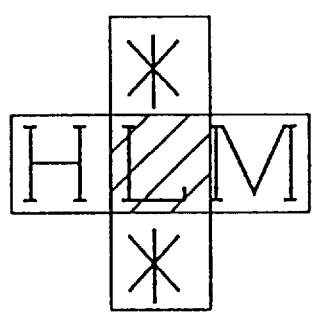
FIGS. 17A to 17F are second views showing the operation of the edge pixel determining circuit in the edge detecting circuit provided in the black edge detecting circuit in the second embodiment.
Figure 17B:
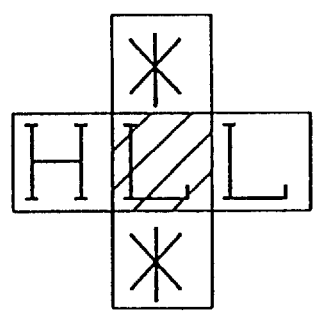
Figure 17C:
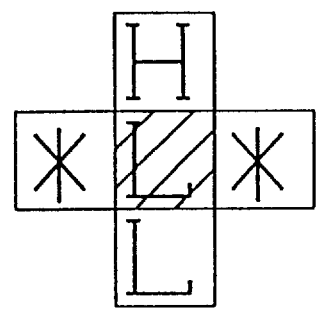
Figure 17D:
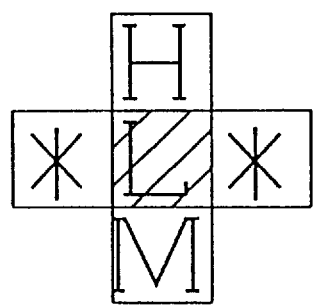
Figure 17E:
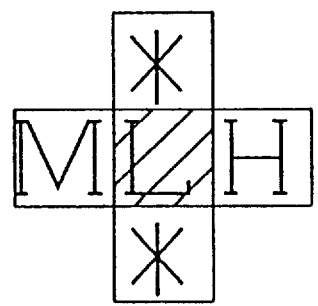
Figure 17F:
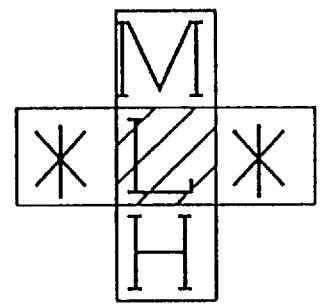

Output complementary color data $D_{C2}$, $D_{M2}$, $D_{Y2}$ and $D_{K2}$ thus processed are outputted from the printer 8 to a copy sheet, so that a copy output 9 is obtained where the rise of the edge in the density distribution is steep as shown in FIG. 15C and a blur 82 around print dots 81 is small as shown in FIG. 15D.

Figure 21B:
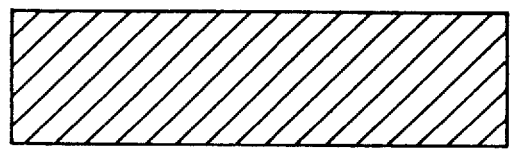
Figure 21C:

As described above, according to the present invention, since the black edge processing circuit 4 which for example, corrects edges is controlled based on the black edge signal $S_{BE}$ outputted by the black edge detecting circuit 10 by reducing the value of the pixel by a predetermined amount or by changing the coefficient of the edge differentiating filter, the generation of blur is restrained as shown in FIG. 15D, so that the resolution of characters improves for black characters not marked with the net pattern (FIG. 21A) and the resolution and the image representation both improve for areas including only the net pattern (FIG. 21B) and for black characters marked with the net pattern (FIG. 21C).

While the complementary color data $D_C$, $D_M$ and $D_Y$ are inputted to the black edge detecting circuit 10 in this embodiment, the outputs $D_{C0}$, $D_{M0}$, $D_{Y0}$ and $D_{K0}$ of the black generating circuit 5 may be inputted thereto. In this case, the black edge processing circuit 4 is arranged to succeed the black generating circuit 5. At this time, the black data generating circuit 41 may be deleted. Moreover, the numeric data $D_R$, $D_G$ and $D_B$ outputted by the scanner 2 may be inputted to the black data generating circuit 41 to perform the complementary color conversion independently.

A second embodiment of the present invention will be described. The structure of an image processor according to this embodiment is the same as that of the first embodiment shown in FIGS. 4 to 7 and only the difference will be described. While in the first embodiment, processing is performed with attention to a pixel located inside the edge to prevent the blur in the image non-reversal, in this embodiment, processing is performed with attention to a pixel located outside the edge to prevent the blur in the image reversal.

For this reason, at the edge pixel determining circuit 46, a pixel located outside the edge is determined based on the ternary signal $S_T$' processed by the isolated point removing circuit 45. As conditions for the determination, there are patterns such as the patterns shown in FIGS. 16A to 16E and FIGS. 17A to 17F. In these figures, noted pixels are hatched. That is, when the value of the noted pixel is "L" and when the values of the eight pixels around the noted pixel take only "H" and "L" as shown in FIGS. 16A to 16E, the logic of an output $S_{ED}$ of the edge pixel determining circuit 46 is "1". FIGS. 16A to 16E show only a part of the patterns as examples.

If the pattern of the adjoining four pixels matches any of the six patterns as shown in FIGS. 17A to 17F, the logic of the output $S_{ED}$ of the edge pixel determining circuit 46 is "1". For this processing, the above-described pattern matching technique is used. In FIGS. 17A to 17F, the values of pixels marked with asterisks and pixels not specified may be any of "H ", "M" and "L".

When the value of the noted pixel is "H", it is determined to be merely a pixel at an edge and only an edge detection signal $S_{SE}$ is outputted. The logic of the output $S_{ED}$ is "0". When the noted pixel is "M" or when the pixel pattern matches none of the patterns shown in FIGS. 17A to 17F although the value of the noted pixel is "L", the logic of the output $S_{ED}$ of the edge pixel determining circuit 46 is "0". The patterns shown in FIGS. 16A to 16E and 17A to 17F are stored in a ROM provided in the edge pixel determining circuit 46.

The output $S_{ED}$ of the edge pixel determining circuit 46 is transmitted to the edge pixel correcting circuit 47. The edge pixel correcting circuit 47 determines whether the pixel is located outside the edge or not according to the pattern matching described with reference to FIG. 14 or the pattern recognition. The edge correction signal $S_{CE}$ outputted from the edge pixel correcting circuit 47 is supplied to the result composer 23 of FIG. 5 where the logical product of the signal $S_{CE}$ and the black determination signal $S_B$ is obtained to output the black edge signal $S_{BE}$ as described previously. The black edge signal $S_{BE}$ represents whether the noted pixel is located outside the edge or not.

Figure 18:
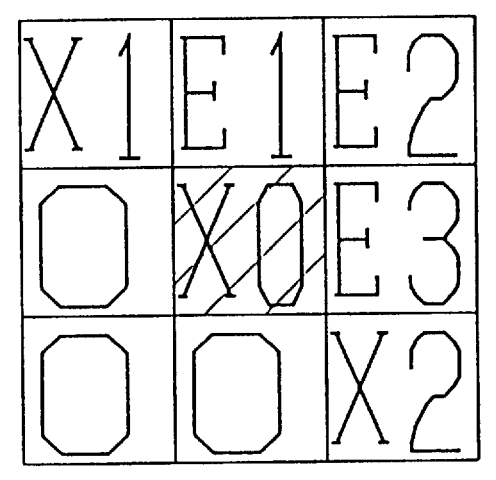

The black edge signal $S_{BE}$ is transmitted to the black edge processing circuit 4. The black edge processing circuit 4 performs thickening as shown in FIG. 18. In the figure, the value X0 of the noted pixel in the center of the figure is represented by the black edge signal $S_{BE}$ and the values E1, E2 and E3 of the surrounding pixels are represented by the edge detection signal $S_{SE}$. Thickening is performed by the following calculation:

$$X0 = \frac{E1 + E2 + E3}{3} \tag{3}$$

As the processing performed at the black edge processing circuit 4, the coefficient of the edge differentiating filter may be changed.

The complementary color data $D_C$, $D_M$ and $D_Y$ corrected through such a processing are transmitted to the black generating circuit 5 as the processed complementary color data $D_{C0}$, $D_{M0}$ and $D_{Y0}$ and then, processed by the tone correcting circuit 6 and the half tone processing circuit 7 to be printed out by the printer 8.

Figure 19A:
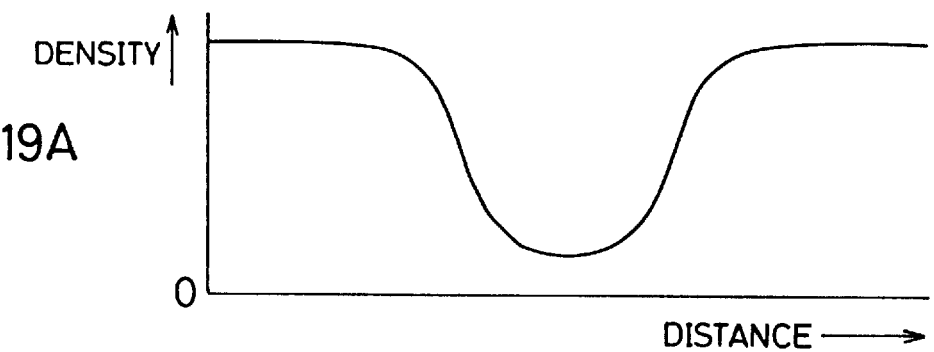
FIGS. 19A to 19D show a density variation at each processing stage and a printing result when a black edge area is processed in the second embodiment.
Figure 19B:
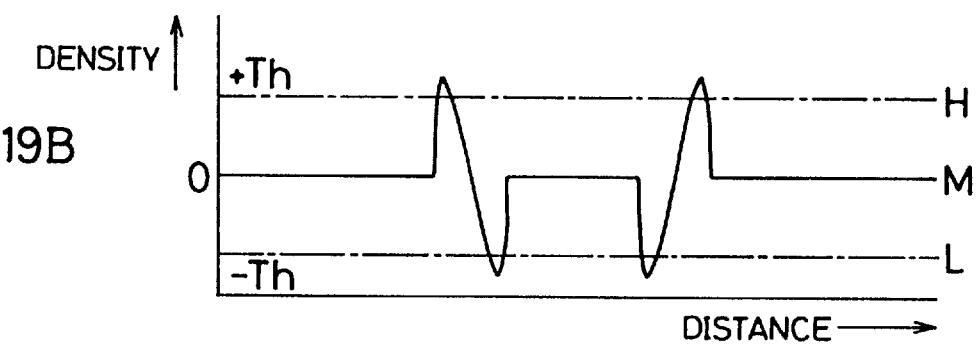
Figure 19C:
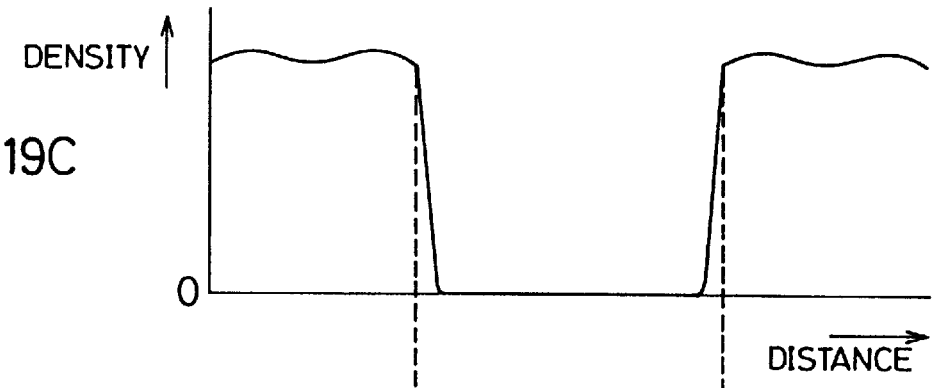
Figure 19D:
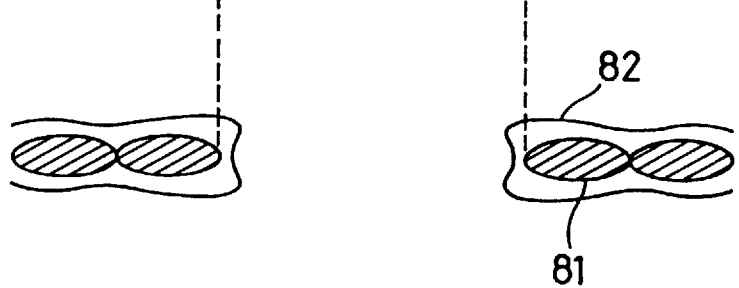
Figure 20A:
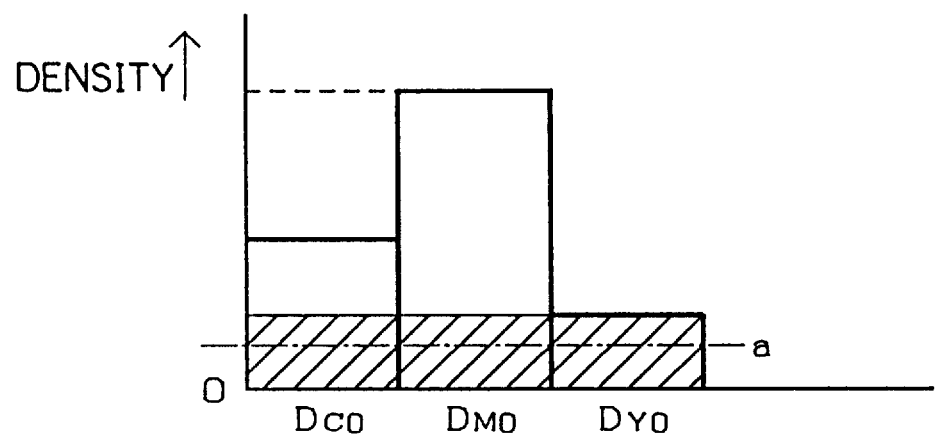
FIGS. 20A and 20B show a general operation principle of the under color removal processing.
Figure 20B:
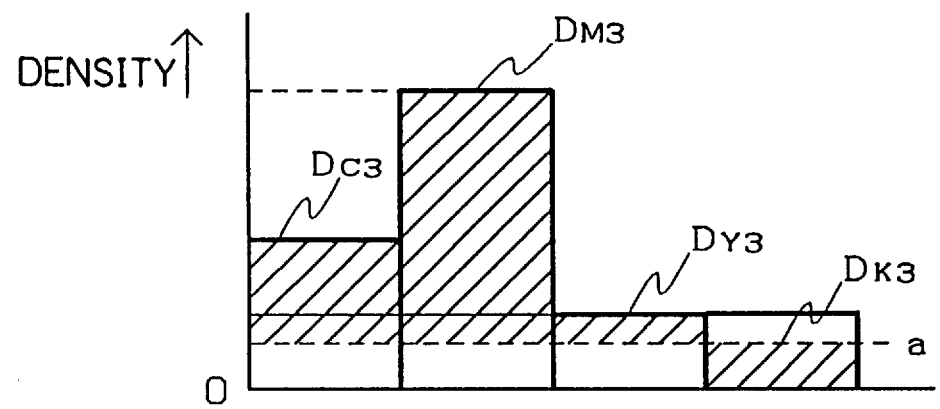

Referring to FIGS. 19A to 19D, there are schematically shown a density variation in the black edge area processing and the configuration of the printed image in this embodiment. FIG. 19A shows an output of the smoothing filter 42. FIG. 19B shows an output of the edge extracting filter 43. FIG. 19C shows the density of the image printed out from the printer 8. The rise of the edge is sharp. As a result, the copy output 9 is obtained where the blur 82 around the print dots 81 is small as shown in FIG. 19D.

As described above, according to the present invention, for example, since the black edge processing circuit 4 which corrects edges is controlled based on the black edge signal SBE outputted by the black edge detecting circuit 10 by reducing the value of the pixel by a predetermined amount or by changing the coefficient of the edge differentiating filter, the generation of blur is restrained as shown in FIG. 19D, so that fine line portions are not battered even though reversal is performed and the improvement of image representation and the prevention of batter of fine lines are both achieved.

While only a color copying machine is described in the above-described two embodiments, the present invention can be realized, in completely the same structure, in word processors handling image inputs. For video printers, the scanner 2 is replaced by a circuit which converts a composite or a YC-separated video signal into R, G and B signals, and the present invention is adaptable to the processing performed after the processing at the complementary color reversing circuit 3.

Moreover, the present invention is readily employed for printing compressed digital image data inputs from video compact disks, digital video disks, digital video tape recorders and the like only merely by replacing the processing stage preceding the scanner 2 with an expanding circuit as a digital input from a coaxial cable or an optical cable.

While the image processors of the embodiments premise color printing, in the case of monochrome images, the R,G and B signals and the C, M and Y signals are replaced by a single signal merely representing a shade. In this case, the black generating circuit 5 is unnecessary and the processings for the three complementary colors are abridged into a single processing for black.

Obviously, many modifications and variations of the present invention are possible in light of the above teachings. It is therefore to be understood that within the scope of the appended claims, the invention may be practiced other than as specifically described.

What is claimed is:

1. An image processor which emphasizes an edge of an image, comprising:

generating means for generating an image signal for each pixel in an area including the image;

extracting means for extracting an image signal whose level is different from a level of an image signal of an adjoining pixel by a predetermined value or more;

modifying means for modifying the level of the extracted image signal based on levels of image signals of neighboring pixels;

comparing means for comparing the modified level of the image signal with two predetermined levels and generating a ternary signal according to a result of comparison;

selecting means for selecting a pixel as one of a plurality of pixels forming an edge of the image when the ternary signal thereof and the ternary signals of adjoining pixels form a predetermined pattern; and emphasizing means for emphasizing the edge of the image by modifying the level of the image signal of the selected pixel.

2. An image processor according to claim 1, wherein the modifying means multiplies the extracted image signal by a predetermined positive factor, multiplies the image signals of the neighboring pixels by predetermined negative factors, and adds the multiplied image signals of the neighboring pixels to the extracted and multiplied image signal, and wherein absolute values of said predetermined negative factors are smaller as a distance between the pixel of the extracted image signal and the neighboring pixel is longer, and sum of the absolute values is equal to said predetermined positive factor.

3. An image process according to claim 1, wherein changing means is provided for changing a value of a ternary signal of a pixel when the ternary signal of the pixel and ternary signals of adjoining pixels form a predetermined pattern, so that the pixel is not to be selected by the selecting means.

4. An image processor which emphasizes an edge of a color image, comprising:

separating means for separating a color image into three images of primary colors;

judging means for judging a point in the color image to be achromatic when a difference between a maximum intensity of the three images of primary color and a minimum intensity of the three images of primary color is within a predetermined range, and the minimum density of the three images of primary color is above a predetermined level;

color edge detecting means for detecting an edge in the color image based upon the minimum intensity of the three images of primary colors;

black edge determining means for determining an achromatic edge of the color image based upon the points judged to be achromatic by the judging means and the edge detected by the color edge detecting means; and emphasizing means for emphasizing the achromatic edge of the color image.

5. An image processor for emphasizing a black edge in an image, comprising:

separating means for separating a color image into three images of primary colors;

a black edge detecting circuit for detecting black edges in the color image, the black edge detecting circuit including judging means for judging when a point in the color image is achromatic, the judging means including maximum and minimum intensity determining means for determining a maximum intensity and a minimum intensity among the three primary colors for a judged point, and achromatic indication means for indicating that the judged point is achromatic when an absolute value of a difference between the maximum intensity and the minimum intensity is within a predetermined range and when the minimum density is above a predetermined level and color edge detecting means for detecting points which are associated with an edge in the color image, and black edge determining means for determining black edges in the color image by identifying which points of the color image are both achromatic and are associated with an edge in the color image; and a black edge processing circuit for emphasizing the black edges detected by the black edge detecting circuit.

6. An image processor for emphasizing a black edge in an image, comprising:

separating means for separating a color image into three images of primary colors;

a black edge detecting circuit for detecting black edges in the color image, the black edge detecting circuit including judging means for judging when a point in the color image is achromatic, color edge detecting means for detecting points which are associated with an edae in the color image, the color edge detecting means including edge extracting means for receiving an image signal corresponding to the color image and extracting edge data from the image signal, ternarizing means for comparing the edge data with two threshold values and generating a ternary signal according to the comparison, isolation point removing means for modifying a level of the ternary signal corresponding to a noted point of the color image based upon levels of the ternary signals corresponding to points of the color image adjoining the noted point, and associating means for associating the noted point with an edge in the color image when the ternary signal corresponding to the noted point and the ternary signals corresponding to points of the color image adjoining the noted point together form one of a plurality of predetermined patterns, and black edge determining means for determining black edges in the color image by identifying which points of the color image are both achromatic and are associated with an edge in the color image, and a black edge processing circuit for emphasizing the black edges detected by the black edge detecting circuit.

7. An image processor as recited in claim 6, wherein the color edge detecting means further includes a smoothing filter for removing noise from the image signal.

8. An image processor as recited in claim 6, wherein the associating means determines that a noted point is a final within-edge point when the ternary signal corresponding to the noted point and the ternary signals corresponding to points of the color image adjoining the noted point together form one of a plurality of predetermined patterns.

9. An image processor as recited in claim 6, wherein the associating means determines that a noted point is outside an edge when the ternary signal corresponding to the noted point and the ternary signals corresponding to points of the color image adjoining the noted point together form one of a plurality of predetermined patterns.

10. An image processor as recited in claim 6, wherein the image signal is based upon black data for the color image.

11. A black edge detecting circuit for a image processor, the black edge detecting circuit comprising:
   judging means for judging when a point in a color image to be processed is achromatic, the judging means including
      maximum and minimum intensity determining means for determining a maximum intensity and a minimum intensity among three primary colors for a judged point, and
      achromatic indication means for indicating that the judged point is achromatic when an absolute value of a difference between the maximum intensity and the minimum intensity is within a predetermined range and when the minimum density is above a predetermined level;
   color edge detecting means for detecting points in the color image which are associated with an edge in the color image; and
   black edge determining means for determining black edges in the color image by identifying which points of the color image are both achromatic and are associated with an edge in the color image.

12. A black edge detecting circuit for a image processor, the black edge detecting circuit comprising:
   judging means for judging when a point in a color image to be processed is achromatic;
   color edge detecting means for detecting points in the color image which are associated with an edge in the color image, the color edge detecting means including
      edge extracting means for receiving an image signal corresponding to the color image and extracting edge data from the image signal,
      ternarizing means for comparing the edge data with two threshold values and generating a ternary signal according to the comparison,
      isolation point removing means for modifying a level of the ternary signal corresponding to a noted point of the color image based upon levels of the ternary signals corresponding to points of the color image adjoining the noted point, and
      associating means for associating the noted point with an edge in the color image when the ternary signal corresponding to the noted point and the ternary signals corresponding to points of the color image adjoining the noted point together form one of a plurality of predetermined patterns; and
   black edge determining means for determining black edges in the color image by identifying which points of the color image are both achromatic and are associated with an edge in the color image.

13. An image processor as recited in claim 12, wherein the color edge detecting means further includes a smoothing filter for removing noise from the image signal.

14. An image processor as recited in claim 12, wherein the associating means determines that a noted point is a final within-edge point when the ternary signal corresponding to the noted point and the ternary signals corresponding to points of the color image adjoining the noted point together form one of a plurality of predetermined patterns.

15. An image processor as recited in claim 12, wherein the associating means determines that a noted point is outside an edge when the ternary signal corresponding to the noted point and the ternary signals corresponding to points of the color image adjoining the noted point together form one of a plurality of predetermined patterns.

16. An image processor as recited in claim 11, wherein the image signal is based upon black data for the color image.

17. An image processor as recited in claim 5, wherein the color edge detecting means further includes a smoothing filter for removing noise from the image signal.

18. An image processor as recited in claim 5, wherein the image signal is based upon black data for the color image.

19. An image processor as recited in claim 5, wherein the judging means includes:
   maximum and minimum intensity determining means for determining a maximum intensity and a minimum intensity among the three primary colors for a judged point; and
   achromatic indication means for indicating that the judged point is achromatic when an absolute value of a difference between the maximum intensity and the minimum intensity is within a predetermined range and when the minimum density is above a predetermined level.

20. An image processor as recited in claim 11, wherein the color edge detecting means further includes a smoothing filter for removing noise from the image signal.

21. An image processor as recited in claim 12, wherein the image signal is based upon black data for the color image.

22. An image processor as recited in claim 12, wherein the judging means includes:
   maximum and minimum intensity determining means for determining a maximum intensity and a minimum intensity among three primary colors for a judged point; and
   achromatic indication means for indicating that the judged point is achromatic when an absolute value of a difference between the maximum intensity and the minimum intensity is within a predetermined range and when the minimum density is above a predetermined level.

* * * * *